United States Patent
Maugg

[15] 3,648,448
[45] Mar. 14, 1972

[54] HAY RAKE, TEDDER OR CROP-TURNING IMPLEMENT

[72] Inventor: Josef Maugg, Glarus, Switzerland

[73] Assignee: Maschinenfabrik FAHR AG, Gottmadingen, Germany

[22] Filed: Aug. 11, 1970

[21] Appl. No.: 62,993

[52] U.S. Cl. ................................................56/370, 56/400
[51] Int. Cl. .........................................................A01d 79/00
[58] Field of Search ...........................................56/370, 400

[56] References Cited

UNITED STATES PATENTS

| 3,475,890 | 11/1969 | Purrer et al. | 56/370 |
| 3,511,040 | 5/1970 | Purrer et al. | 56/370 |
| 3,546,867 | 12/1970 | Hauser-Lienhard | 56/370 |
| 3,555,800 | 1/1971 | Stoll et al. | 56/370 |

FOREIGN PATENTS OR APPLICATIONS

| 6,502,898 | 9/1966 | Netherlands | 56/370 |
| 450,792 | 4/1968 | Switzerland | 56/400 |

Primary Examiner—Russell R. Kinsey
Attorney—Karl F. Ross

[57] ABSTRACT

A rake, tedder or crop turner for mowed crop adapted to build or destroy a windrow comprises a rotary rake having a plurality of spokes anchored to a rotating hub. The rake tines are fixed to a sleeve mounted on the end of each rake arm and centrifugally displaceable outwardly upon the rotation thereof against a restoring force which, in the absence of rake rotation, tends to draw the sleeve inwardly. In addition, an eccentric is provided for periodically drawing the sleeves inwardly as the rake rotates. Each sleeve and the corresponding spoke are provided with complementary camming means imparting an angular displacement to the sleeve about the axis of the spoke, thereby lifting the tines from the crop material at a predetermined point during each rotation of the rake and lifting all of the tines upon inward movement of the sleeve when the rake is not rotated.

16 Claims, 7 Drawing Figures

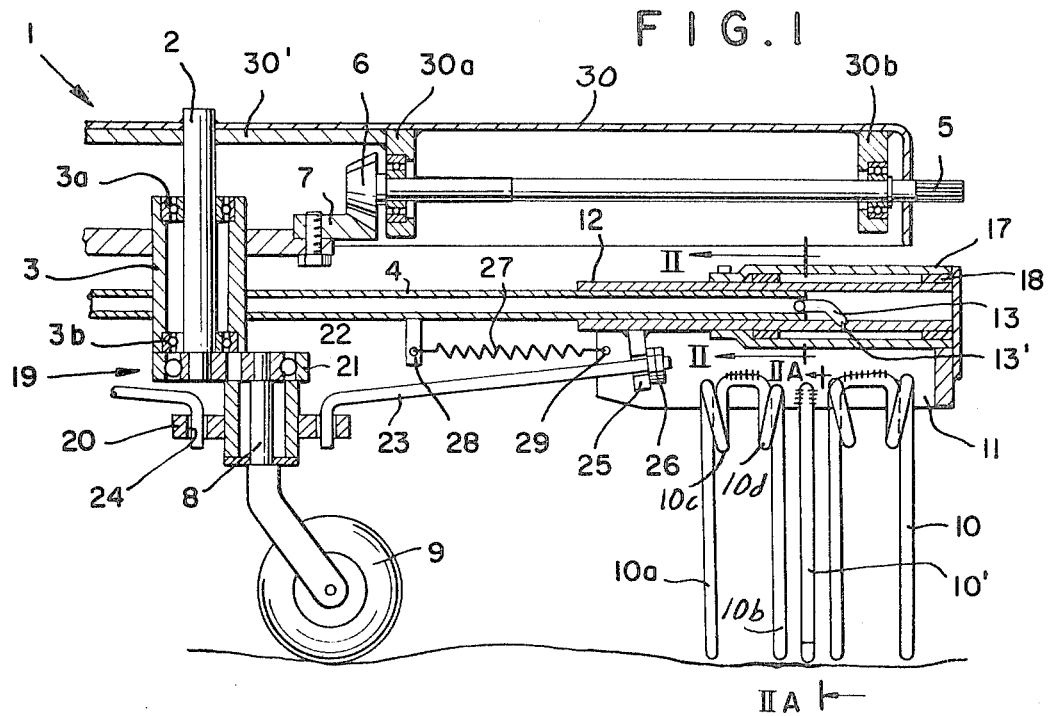
FIG. 1
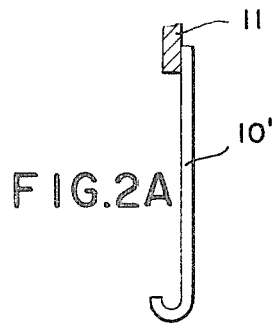
FIG. 2A
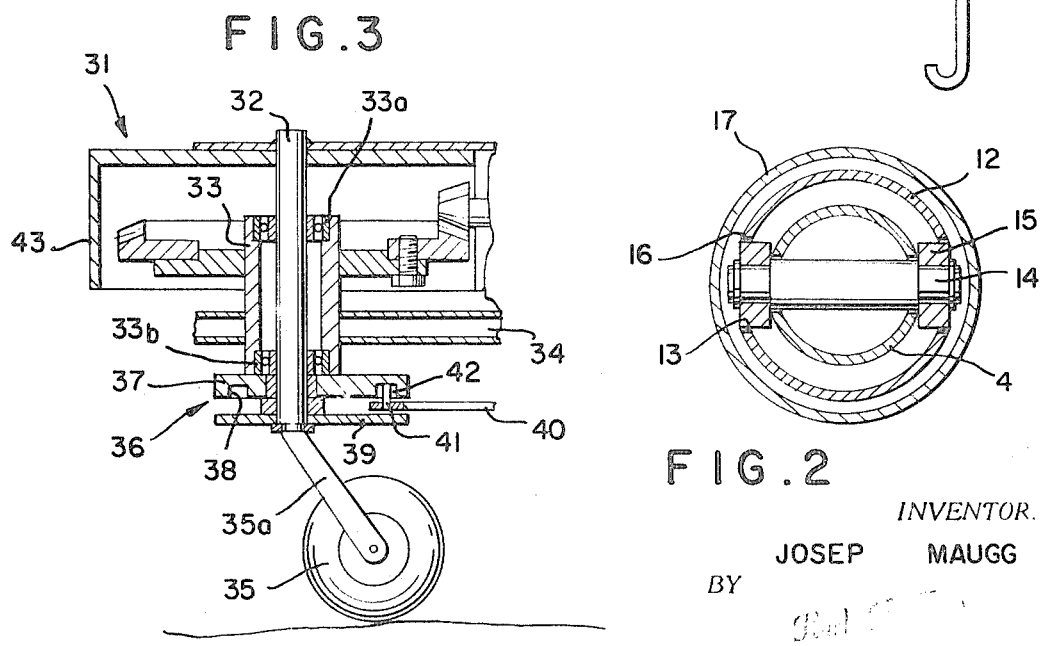
FIG. 3
FIG. 2
INVENTOR.
JOSEP MAUGG
BY
ATTORNEY

INVENTOR.
JOSEP MAUGG

HAY RAKE, TEDDER OR CROP-TURNING IMPLEMENT

My present invention relates to an agricultural machine and, more particularly, to rotating rakes, tedders and crop turners of the type in which at least one rake is rotatable about a generally upright axis and has downwardly extending tines at the ends of each rake arm which engage the drop material and cast it to a side.

Rotating rakes, tedders and crop turners have been provided heretofore with one or more rotating rakes, generally driven from the power takeoff of a towing tractor, for the collection and treatment of the crop material deposited in the soil. Forage crop, e.g., grass, alfalfa, clover and forage grain, frequently is mowed to deposit swaths of the stalks in random fashion upon the soil. The mowing is often followed by a raking operation in which rakes drawn by tractors or the like are drawn over the crop material and have moving members, generally including tines, which cast the crop material to the side or along a line parallel to the direction of travel of the tractor, whereby forming a row (windrow). For the most part, mowing is accomplished in swaths and each swath or several swaths are windrowed by side-delivery or center-delivery rakes. In a side-delivery rake, all the elements move generally in one direction tending to cast the crop material to one side of the rake. Center-delivery rakes, however, have moving rake elements to each side of a central zone at which the crop material is deposited. Following the windrowing operation and after a period sufficient to permit the crop material to dry or cure, rakes or tedders may be employed anew to turn the crop or breakup the windrow preparatory to a further raking. The latter operations ensure proper drying and curing of the forage crop. Thereafter, the windrow is traversed by a bailer or stack former designed to compact the forage crop and pick it up from the ground.

As has been noted earlier, rotating rakes, tedders and crop turners have been provided heretofore in the form of one or more rotating rake members comprising a hub driven by a power takeoff from the tractor or a prime mover, and carrying a plurality of generally radial arms which extend outwardly substantially parallel to the ground surface, the ends of the arms being provided with spring tines which extend downwardly and engage the crop material. It has also been proposed, in connection with systems of the latter type, to provide means for elevating the tines from the ground-surface to deposit the crop material at the predetermined location during each rotation of the arms or spokes. It has also been suggested to provide means for withdrawing the tines from the ground surface when the implement is to be transported, e.g., to and from the field.

In all of these systems, problems have been encountered as a result of the complexity of the tine-control devices which have increased the cost of such implements prohibitively, have opened the door to operational failure because of the complexity in the mechanism, and have required manual operations to perform the necessary functions. The same has been true of systems designed to adjust the position of the tines in accordance with variations in the topography of the field traversed by the implement.

It is, therefore, the principal object of the present invention to provide a rotary rake, tedder or forage-crop turner in which the aforedescribed disadvantages are avoided.

It is another object of this invention to provide an implement of the character described which is of low cost and generally simple construction, free from systems which are prone to breakdown, and affords automatic control of the functions enumerated above.

It is yet another object of this invention to provide an improved implement of the character described in which retraction of the rake tines from the ground surface automatically occurs when the implement is about to be transported to and from the field or over relatively long distances across the latter.

Still another object of my invention is to provide an implement of the character described with improved means for accommodating the level of the rake tines to variations in the topography of the field traversed thereby.

It is also an object of my invention to provide, in an implement of the character described, improved means for lifting the tines from the crop material at a predetermined location in each rotation of the rake.

These objects and others which will become apparent hereinafter are attained in accordance with the present invention, in a rotary rake, tedder or crop turner which comprises a support carrying a rotating rake member having a driven hub and a plurality of generally radial arms or spokes extending from this hub, each of the arms or spokes carrying at its free extremity and axially shiftable sleeves upon which the depending tines (for engagement with the crop material) are fixed, means being provided between a spoke or arm and the respective sleeve for effecting an angular displacement of the sleeve (and the tines carried thereby) upon inward axial displacement of the sleeve along the spoke or arm.

In accordance with one aspect of the invention, an eccentric, cam disc or the like is operatively connected with each of the arms and is disposed in the region of the aforementioned hub for drawing the sleeves axially inwardly (radially inwardly with respect to the hub) periodically during each rotation of the rake member. The sleeves advantageously are held outwardly, at least during rotation of the rake member, by centrifugal force, and antifriction means is provided between the spoke or arm and the tine-carrying sleeve mounted thereon, to permit relatively free axial displacement of the sleeve and the arm without substantial impediment to the centrifugal force.

According to another feature of this aspect of the invention, the means for periodically shifting the sleeves axially with each rotation of the rake member, comprises an eccentric disc mounted on a shaft or axle upon which the hub is rotatably supported, the disc, in turn, being coupled by rods with the sleeves. The disc is eccentric with respect to the axis of the shaft or axle and has a throw which determines the position of each sleeve along the respective arm in accordance with the angular position of the rake member. Alternatively, the eccentric may be constituted by a disc on axle or shaft about which the sleeves and the arms rotate and engaged by cam-follower rollers connected by rods with the aforementioned sleeves. However, in its preferred state, the accentric is constituted by a disc which is connected to the shaft and, in turn, defines the fixed axis of a support wheel carrying the rake member, the shank or shaft of this support wheel, in turn, constituting a pivot for a rotatable member, located eccentrically with respect to the axis of the rake member itself, and coupled by a rod or the like with the sleeves so that each sleeve approaches this rotatable member during a portion of its travel about its axis and is relatively distal therefrom during another portion. In a proximal position, of course, the sleeves are drawn inwardly to swing the tines out of the engagement with the crop and deposit the latter.

According to another aspect of the invention, restoring means is provided to bias the sleeves axially inwardly (radially inwardly with respect to the hub) in the absence of the aforementioned centrifugal force, such means serving to swing each of the sleeves about its axis on the respective arm and thereby deviate the tines from the ground surface for transport of the implement.

The last mentioned means may include a counter weight operatively coupled with each sleeve, e.g., via a chain, or a spring tending to draw this sleeve axially inwardly.

According to another feature of this invention, the camming formations, which are effective upon axial displacement of each sleeve to rotate the latter about its axis and the axis of the respective arm, may include axially extending grooves formed in the sleeves and cooperating with projections lateral of the arm and fixed thereto, the groove having portions which are inclined with respect to the axis of the arm to effect the pivotal movement mentioned earlier as each sleeve is drawn inward along the respective arm. The formations may be constituted, therefore, by longitudinally extending slots or inclined-plane surfaces and may have straight or curved portions and may be composed of a plurality of the axially extending or inclined sections. The projections, according to the invention, have the frictional engagement with the camming surfaces reduced with the aid of antifriction means, e.g., cam-follower rollers. The projections, rollers and surfaces may further be provided with antifriction means in the form of low-friction synthetic-resin layers, e.g., of a polytetrafluoroethylene such as Teflon.

Still another feature of this invention resides in mounting of two or more such rakes on a common beam and providing them with a common drive, the beam being swingable about a generally upright axis to adjust the effective distances of the rake members from one another. Furthermore, each of the rake members can be movably mounted on this beam to provide still another adjustment, while guide means may be provided on one or both of the members to define the outer edge of the windrow formed by the rake.

The above and other objects, features, and advantages of the present invention will become more readily apparent from the following description, reference being made to the accompanying drawing in which:

FIG. 1 is a fragmentary vertical cross section through a rake member embodying the invention and illustrating related parts;

FIG. 2 is a cross-sectional view taken along the line II—II of FIG. 1 and drawn to a slightly enlarged scale.

FIG. 2A is a view taken along the line IIA—IIA of FIG. 1;

FIG. 3 is a detail view constituting a vertical cross section to the hub portion of a rake member according to another embodiment of this invention;

Figure 4:
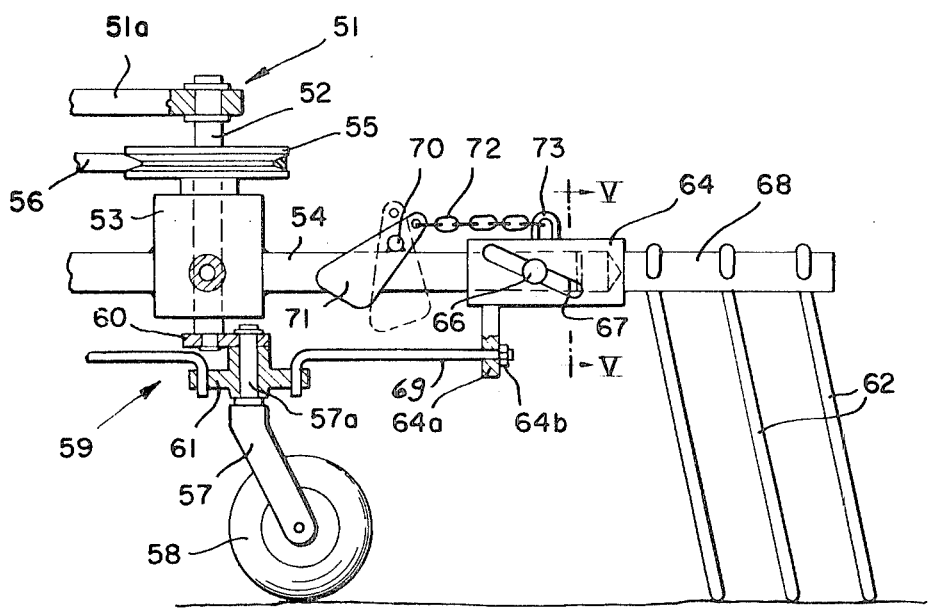
FIG. 4 is a view generally similar to FIG. 1 but illustrating another embodiment of this invention.

In FIGS. 1 and 2 I show an implement of the character described generally above and adapted to be drawn by the tractor not shown. The implement 1 comprises a plurality of rake assemblies, one of which is illustrated at 1 in FIG. 1 and is supported by a wheel 9. The assembly comprises a fixed support axle which is rigid with the housing 30 which shields a drive shaft 5, the right-hand end of which is splined to receive a coupling to the power takeoff shaft of the tractor.

The cover 30 is mounted upon a support beam 30' in which the shaft 2 is nonrotatably anchored to form an axle for the hub 3 of the rake member.

The hub 3 is journaled on the shaft 2 by a pair of roller bearings 3a and 3b and carries a plurality (e.g., four) of generally radial rake arms or spokes 4, each of which is provided with the crop-engaging tines in the form of couble-spring tines 10 of conventional construction.

Each of the couple tines have a pair of downwardly extending members 10a and 10b lying in a plane parallel to the axial plane through the shaft 2 and including the radial arm 4 upon which the tine is mounted. The members 10a and 10b are connected by single-turn spring loops 10c with a bight 10d which is welded to a plate 11 described in greater detail herein below. The support 30, 30' comprises a pair of journal blocks 30a and 30b which are formed with bearings rotatably journaling the shaft 5, the left-hand end of which is provided with a bevel pinion 6 which rotates a bevel gear 7 welded to the hub 3. Rotation of the shaft 5 drives the hub 3 and the arms 4, angularly above the axis defined by the shaft 2. The support 30, 30' is anchored to the draw bar of the tractor by any conventional hitch arrangement not shown.

As noted, the double tines 10 are welded by their bights 10d to a plate 11 which, in turn, is welded to a sleeve 12 which is axially shiftable on the end of the respective arm or spoke 4. In other words, the arm or spoke 4 and the respective sleeve are telescoped together, the sleeve being axially shiftable on the arm and pivotal about the axis of the latter and about its own axis which coincides with that of the spoke or arm. Upon rotation of the sleeve 12, therefore, the tines 10 carried thereby are swung upwardly away from engagement with the ground and out of the crop material formerly entrained by the tines.

To rotate the sleeve 12 and the tines 10 carried thereby upon the axial displacement of the sleeve, I have provided in the sleeve 12 a pair of diametrically opposite recesses 13 (see FIG. 2) having a longitudinally extending portion which terminates, remote from the hub 3, in a portion 13' inclined to the axis of the spoke or arm and of the sleeve (see FIG. 1). The resulting cap is engaged by a lateral projection in the arm or spoke 4, the projection having the configuration of a pin 14 which extends laterally outwardly from the tubular arm and carries a pair of antifriction rollers which engage the flanks 16 of the camming recesses 13. The recesses 13 and 13' can be arcuate or can be composed of one or more axially oriented and/or inclined or curved formations and may be replaced by equivalent camming surfaces such as inclined planes, ramps or the like. To reduce friction, wear-reducing layers may be provided along the surfaces 16. The layers may be composed of low-friction synthetic resin material, e.g., polytetrafluoroethylene—Teflon. Similar polytetrafluoroethylene films may be provided on the surfaces of the roller or internally of the roller along the journal thereof. An outer sleeve or cover 17 is fitted over the sleeve 12 with a clearance defined by spaces 18 and is bolted in place to present the entry of contaminants into the recesses 13 and 13'.

The axial displacement of the sleeve 12 and the rotatable engagement of the rollers 15 over the camming surfaces 16 of the recesses 13, 13' and, consequently, effecting a lifting movement of the tines 10 in a predetermined region of the rotary sleeve of the rake member, is produced by an eccentric 19 which is operatively connected with each of the sleeves 12. The eccentric 19 is, in the embodiment of FIG. 1, composed of a rotatable disc 20 whose hub is journaled freely upon the shank 8 which constitutes an upright axle or shaft for this disc. The shaft 8, in turn, is received in an opening 22 of an intermediate member 21 which is fixed to the shaft 2. As shown in FIG. 1, the member 21 may be bipartite and separable upon the release of a clamping screw to enable the shank 8 to be withdrawn from one opening 22 and inserted into the other. Consequently, the throw of the eccentric can be readily adjusted. The disc 20 is provided with angularly equispaced apertures 24 in which downwardly turned and of connecting rods 23 are received, the connecting rods serving as rigid force-transmitting members between the eccentric 19 and the respective sleeve 12. At the inner end of each sleeve 12, there is provided a depending lug 25 through which the rod 23 passes with clearance, and an abutment 26, in the form of nut, being provided on the portion of the rod extending outwardly (with respect to the axis of rotation of the lug member) of the lug. Hence the member 12 is free to move axially inwardly without impediment by the rod or bar 23, while the rod or bar, upon inward movement, brings the abutment 26 into engagement with the lug 25 and, consequently, draws the sleeve 12 axially inwardly.

A depending lug 28 is also provided on the arm 4 inwardly of the sleeve 12 to form an anchor for a tension spring 27. The spring 27 is dimensioned to be somewhat weaker than the centrifugal force tending to urge the sleeve 12 radially outwardly along the arm 4 upon rotation of the rake member at the minimum rotary speed of the operating rake, but to exceed the force required to draw the sleeve 12 radially inwardly along this arm. Hence, immediately upon terminating the raking operation and upon immobilization of the rake member, each spring 27 will become effective to draw up the respective sleeve 12 radially inwardly and permit the camming formations to swing the tines 10 away from engagement with the crop material and into a retracted position preparatory to transportation of the implement over roads, fields, etc. This system has, moreover, the advantage that, in the transport condition, the overall diameter of the rake member is reduced by twice the axial length of the recesses 13, 13'.

Aside from the tines 10, the plate 12 carries a sliding shoe 10' (FIGS. 1 and 2A) which is designed to be somewhat longer than the tines 10 and slidingly engages the ground between them. The shoe 10' enables the arms 4 and the tines 10 to accommodate themselves to irregularities in the ground surface and, by virtue of the fact that the shoe lies in a plane perpendicular to the arm 4, enable free rotation of the sleeve 12 without permitting the tines 10 to catch in the matted crop material still fixed in the ground. The shoe 10' has, therefore, the triple function of accommodating the tines to various changes in ground surface or topography, of facilitating movement of the sleeve 12 without the retarding engagement of the tines 10, and of retaining the tines 10 out of engagement with the ground so that they can perform their proper raking function without hinderence.

In operation, the implement is hitched to the tractor as the power takeoff shaft of the tractor is coupled to the shaft 5 via the usual universal joint and power transmission shaft. As soon as the implement is set into operation, i.e., the shaft 5 is rotated to drive the hub 3 and arms 4, centrifugal force casts the sleeves 12 radially outwardly against the force of the respective spring 27 to bring the camming roller 15 into the axial portion of the recess 13, 13'. The tines 10 are thus rotated downwardly into the operative position. During each revolution of the rake member 3, 4, 12, therefore, the distance between the outer end of each arm 4 and the axis defined by the shank 8 changes in accordance with eccentric principles and the sleeve 12 is the telescoped over the arm 4 or drawn out of a telescoped condition. The periodic telescoping operation, of course, results in corresponding angular movement of the sleeve 12 to lift the tines 10 at a predetermined location to deposit the crop material in the windrow.

Upon termination of the raking operation, the power takeoff is shut off and rotation of the rake member 3, 4, etc. is terminated. Consequently, the centrifugal force previously holding the sleeves 12 inwardly on the arms 4, is terminated and the springs 27 draw all of the sleeves (regardless of their location with respect to the excentric) radially inwardly to permit the caming formation 13 through 15 to swing the sleeves about their axis and lift all of the times from the ground surface. The implement is thus in condition for transportation, the overall diameter of each rake member having been reduced and all depending portions, with the exception of the support wheel 9, having been withdrawn from the ground. Furthermore, no intervention by operating personnel is required to bring the implement into this transport mode.

In FIG. 3 I have shown a modification of the invention wherein the housing and support structure 43 for the rake member 31 includes a vertical shaft 32 which is nonrotatable in this housing or support structure. The hub 33 of the rake wheel is journaled upon the shaft 32 by bearings 33a and 33b and carries a plurality of radial tubular spokes or arms 34 which are provided each with a respective sleeve 12 and the associated camming formations and rake times (see FIGS. 1, 2 and 2a).

In this embodiment, however, the support wheel 35 is carried in a bifurcated arm 35a which is rigid with the shaft 32 or can be swivalably connected therewith. For radial displacement of the sleeves 12 in this system, I provide an excentric cam 37 in the form of a disk which is fixed to the shaft 32 and formed with a downwardly open but endless camming groove 38 having portions which are proximal to the axis of shaft 32, the latter coinciding with the axis of rotation of the rake wheel 33, 34. Other portions of the cam groove 38 are relatively distal from this axis. Cam-follower rollers 42 are received in the groove 38 and are rotatable upon upright pins 41 anchored to rods 40 which otherwise may have the configuration illustrated for the rods 23 of FIG. 1.

A disk or plate 39 is disposed below the cam 37 and is spaced therefrom by a distance which is less than the height of the cam-follower roller to prevent the latter from dropping out of the groove 38. When the cam-follower roller engages a portion of the cam groove 38 relatively distal from the axis of the rake wheel 33, 34, the sleeves 12 are at maximum extension while their tines engage the crop material in the usual manner. As the spokes or arms 34 rotate to the diametrically opposite position, however, the cam-follower rods are drawn proximal to the axis and simultaneously move the sleeves 12 radially inwardly to swing the tines away from the crop material and deposit the latter in a windrow.

It will be understood further that the mechanism of FIG. 3 may be substituted for the excentric arrangement of FIG. 1 and that the spring means for automatically rotating the sleeves into the transport position may be used with the system of FIG. 3. Moreover, the counterweight arrangement of FIGS. 4 and 5 may be employed with either of the excentric arrangements of FIGS. 1 and 3 in place of the spring, and/or either eccentric arrangement may be used in the system of FIG. 4. Also, the camming arrangement of FIG. 4 may be used between the sleeve 12, the arm 4 or 34 of FIG. 1 or 3 and that any of the foregoing combinations may be employed in the implement illustrated in FIG. 6.

Figure 5:
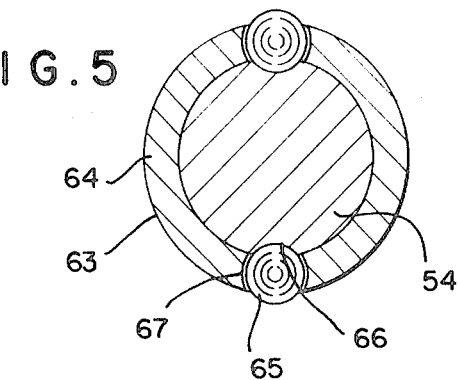
FIG. 5 is a section taken along the line V—V of FIG. 4.

FIG. 4 illustrates an embodiment of this invention wherein the rake wheels are driven by power takeoff from the tractor via a V-belt 56 and a V-belt pulley 55, the tractor carrying a driving pulley of similar construction in accordance with conventional practices. The tractor may be coupled with the implement via a hitch member 51a. FIG. 4 illustrates only one of the rake members 51 of the implement and it should be understood that the implement will generally have 2 or more such rake members. A shaft 52 is nonrotatably anchored to the support 51a and rotatably carries a hub 53 which is anchored to the pulley 55. The rake wheel also includes a plurality, e.g., 4, of radially extending spokes or arms 54, each of which is provided with a rake tines as illustrated at the right-hand side of this FIG. The rake member 51 is supported by a wheel 58 whose fork 57 can be swivably mounted in an intermediate plate 60 forming part of the excentric, the plate 60 being fixed to the shaft 52 as described for the intermediate member 21 in FIG. 1. The stud 57a of the fork 57 is swivably received in the intermediate member 60 at an eccentric location with respect to the axis of rotation of the rake wheel 53, 54. The stud 57a, therefore, defines the eccentric axis about which a disk 61 is rotatable. The disk 61 corresponds to disk 20 (FIG. 1) and is provided with openings into which the downwardly turned fingers of rods 69 are received. The eccentric as a whole is represented at 59.

The rods or bars 69 are slidably received with clearance in a lug 64a of the respective sleeve 64 and are provided with abutments 64b adapted to engage a lug when the rod or bar 39 is shifted radially inwardly. A lost-motion arrangement is also constituted by the rods and lugs to enable the sleeve to to move radially inwardly without obstruction by the rod.

The sleeve 64 comprises a ball sleeve or box 63 telescopically receiving the free end of arm 54 and carrying a small-diameter projection 68 to which the rake tines 62 are secured. The camming formations are here constitutes inclined slots 67 whose flanks are of generally cylindrical configuration and receive the camming balls 65 which are received in recesses 66 of the spokes or arms 64. Upon axial displacement of the sleeve 64, therefore, the sleeve is swung angularly to lift the tine 62 away from the crop material and the ground.

In this embodiment, the spring 27 is replaced by a weight 71 whose center of gravity is located opposite the fulcrum 70 from the point at which a chain 72 is anchored. Chain 72 constitutes a force-transmitting member which slackens when the sleeve 64 is drawn inwardly by the rod 69, but is effective to draw the sleeve 64 inwardly when the centrifugal force thereon is terminated. During rotation of the assembly this centrifugal force overcomes the effect of the weight to shift the sleeve 64 outwardly and position the weight as shown in solid lines in FIG. 4. When centrifugal force is ended, the weight swings downwardly (dot-dash position) automatically to draw the sleeve inwardly and raise the tines 62 into their transport positions.

Figure 6:
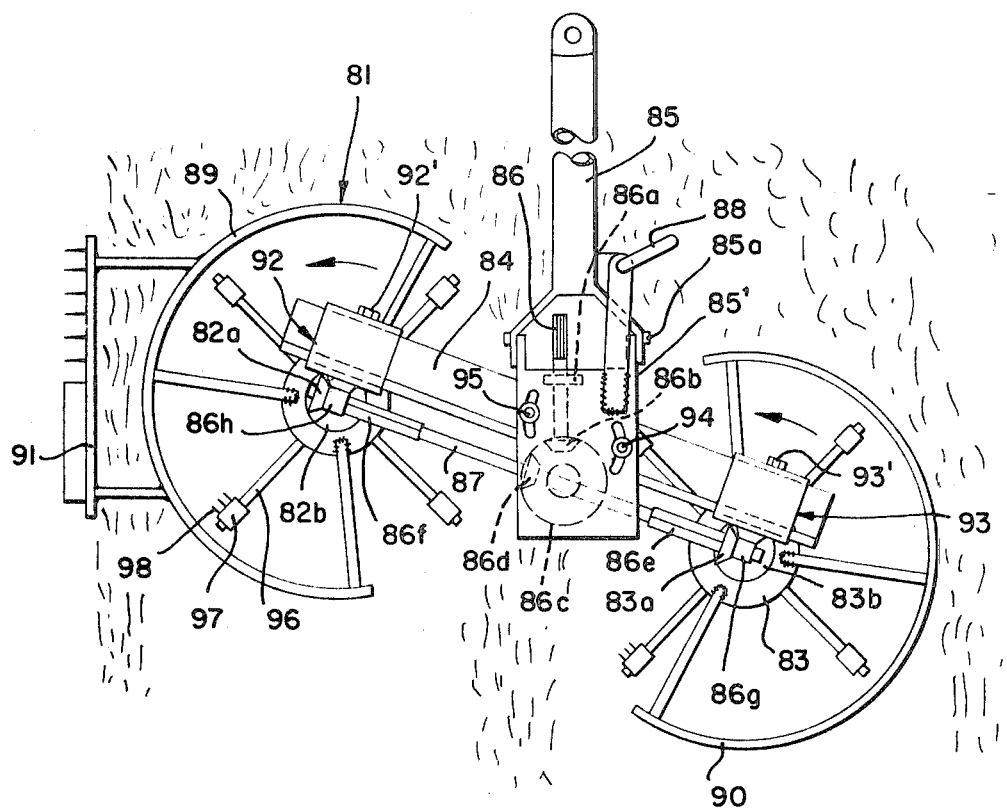
FIG. 6 is a plan view of an implement embodying the invention and provided with two rake members which may be of the type illustrated in FIGS. 1–6.

In FIG. 6, I have shown a rake, tedder or crop turner 81 having a hitch 85 adapted to engage the drawbar of a tractor whose power takeoff shaft may be coupled by conventional means to the input shaft 86 of the rake. The rake comprises a pair of rake wheels 82 and 83 which have hubs, as described earlier, from which radial spokes 96 extend. Radially shiftable sleeves 97 are carried by these spokes and, in turn, support the tines 98 in the manner described in FIGS. 1 and 2, FIG. 3 or FIGS. 4 and 5. The means axially displacing and swinging these sleeves are as shown in these latter figures.

The rake wheels 82 and 83 are carried by supports 92 and 93 which are slidably mounted upon a beam 84 extending generally transversely to the hitch 85. The input shaft 86 is journaled upon a support plate 85' in a bearing 86a only diagrammatically shown in this figure. A bevel pinion 86b carried by the shaft engages a further bevel gear 86c which is rotatable about an axis parallel to the axis of rotation of the rake wheels 82 and 83 and, in turn, meshes with a bevel gear 86d which is carried by a shaft 87 of noncircular (e.g., square or hexagonal) cross section. A pair of sleeves 86e and 86f of complementary cross section engage the shaft 87 and are axially shiftable thereon to permit movement of their supports 92 and 93 when the setscrews 92' and 93' are released. The shaft 87 thus ensures force transmission to the rake wheels in all positions thereof. The sleeves 86e and 86f are, in turn, journaled in bearings 86g and 86h of the supports 92 and 93 and carry bevel gears 82a and 83a meshing with the driven bevel gears 82b and 83b of the respective rake wheels. The crank 88 is operatively connected to the plate 85' which is articulated to the hitch 85 at 85a to permit the inclination of the implement to be adjusted with ease.

To facilitate the setting of the desired distance between the rake wheels 82 and 83, I provide the movable supports 92 and 93, and, moreover, mount the beam 84 upon the plate 85' to enable swinging movement of the beam about a vertical axis. To this end, the plate 85' is provided with a pair of elongated slots 95 through which extend threaded pins of the beam 84. Clamping nuts 94 are threaded on to these bolts to lock the beam in any desired angular position with respect to the direction of movement of the implement. A swath plate may flank the assembly as shown at 91 to define the utter limit of the windrow formed by the rake and to permit orientation of the rake with respect to the moved swath.

I claim:

1. A rake, tedder or crop-turning implement, comprising a support; a rake wheel rotatably mounted on said support and having a plurality of generally radially extending arms; a respective sleeve mounted at the end of each of said arms and radially shiftable therealong while being pivotal about the respective arm; cooperating formations on each of said arms and the respective sleeve for swinging said sleeve upon inward axial displacement of said sleeve along the respective arm; tines carried by said arms and reaching downwardly therefrom; and mechanism for axially shifting each of said sleeves along the respective arm.

2. The implement defined in claim 1 wherein said sleeves are mounted upon the respective arms for radial movement thereon outwardly under centrifugal force generated upon rotation of said rake wheel, said mechanism comprising means biasing said sleeves radially inwardly and applying thereto a force less than said centrifugal force for shifting said sleeves radially inwardly upon termination of rotation of said rake wheel.

3. The implement defined in claim 2 wherein said mechanism includes an eccentric effective upon rotation of said rake wheel and operatively connected to each of said sleeves for drawing said sleeves radially inwardly along the respective arms at a predetermined portion of the orbit of each of said arms about the axis of rotation of said wheel.

4. The implement defined in claim 3, further comprising a fixed axle mounted on said support and extending generally in an upright orientation, said rake wheel having a hub journaled on said axle and carrying said arms, drive means for rotating said hub about said axle, and a support wheel operatively connected with said axle and and engageable with the ground surface.

5. The implement defined in claim 4 wherein said eccentric comprises a cam fixed to said axle and formed with an endless cam groove, cam-follower means in said groove and respective rods connecting each of said cam-follower means with a respective one of said sleeves for axially shifting said sleeves along said arms upon rotation of said rake wheel about said cam.

6. The implement defined in claim 4 wherein said support wheel is provided with a shaft lying eccentrically with respect to said axle and said eccentric includes a disk rotatably mounted on said shaft and respective rods connecting each of said sleeves with said disk whereby said sleeves are displaced axially along said arms upon rotation of said rake wheel.

7. The implement defined in claim 6 wherein said eccentric further includes an intermediate member anchored to said axle and supporting said shaft, said intermediate member being provided with means for adjusting the throw of the eccentric.

8. The implement defined in claim 3 wherein said cooperating formations include elongated recesses formed on each sleeve, and lateral projections formed on the respective arm and cooperating with the corresponding recess.

9. The implement defined in claim 8 wherein said projections are roller elements.

10. The implement defined in claim 9 wherein said recesses having camming surfaces provided with antifriction layers of a synthetic resin.

11. The implement defined in claim 9 wherein each of said sleeves is a ball box and said roller elements are balls recessed in said arms.

12. The implement defined in claim 9, further comprising a housing enclosing said formations for preventing contamination thereof.

13. The implement defined in claim 2 wherein said biasing means includes a tension spring anchored to each of said arms and the respective sleeve.

14. The implement defined in claim 2 wherein said biasing means includes a counterweight mounted on each arm and operatively connected to the respective sleeve.

15. The implement defined in claim 1, further comprising a ground-engaging shoe mounted on each of said sleeves.

16. The implement defined in claim 1 wherein said support includes a tow bar, a beam mounted on said tow bar and carrying a pair of such rake wheels and mechanism for adjusting the inclination of said beam to said tow bar.

* * * * *